United States Patent
Jha et al.

(10) Patent No.: US 11,949,240 B2
(45) Date of Patent: Apr. 2, 2024

(54) METHOD AND SYSTEM FOR PROTECTING A WIRELESS POWER TRANSFER SYSTEM

(71) Applicant: General Electric Company, Schenectady, NY (US)

(72) Inventors: Kapil Jha, Bangalore (IN); Pradeep Vijayan, Bangalore (IN); Yash Veer Singh, Bangalore (IN)

(73) Assignee: General electric company, Schenectady, NY (US)

( * ) Notice: Subject to any disclaimer, the term of this patent is extended or adjusted under 35 U.S.C. 154(b) by 0 days.

(21) Appl. No.: 17/810,935

(22) Filed: Jul. 6, 2022

(65) Prior Publication Data

US 2022/0344974 A1 Oct. 27, 2022

Related U.S. Application Data

(63) Continuation of application No. 16/855,619, filed on Apr. 22, 2020, now Pat. No. 11,394,239, which is a (Continued)

(30) Foreign Application Priority Data

Feb. 3, 2016 (IN) .............................. 201641003929

(51) Int. Cl.
*H02J 50/10* (2016.01)
*H01F 38/14* (2006.01)
(Continued)

(52) U.S. Cl.
CPC .............. *H02J 50/10* (2016.02); *H01F 38/14* (2013.01); *H02J 50/80* (2016.02); *H04B 5/0037* (2013.01)

(58) Field of Classification Search
CPC ........... H02J 50/10; H02J 50/80; H01F 38/14; H04B 5/0037; H04B 5/02
(Continued)

(56) References Cited

U.S. PATENT DOCUMENTS

| 6,037,745 A | 3/2000 | Koike et al. |
| 7,595,569 B2 | 9/2009 | Ameron et al. |

(Continued)

FOREIGN PATENT DOCUMENTS

| CN | 104795903 | 7/2015 |
| EP | 2632014 | 8/2013 |

(Continued)

OTHER PUBLICATIONS

"Japanese Application No. 2022052669 Notice of Reasons for Refusal", dated Sep. 30, 2022, 2 pages.
(Continued)

*Primary Examiner* — Hal Kaplan
(74) *Attorney, Agent, or Firm* — DeLizio, Peacock, Lewin & Guerra LLP

(57) ABSTRACT

A wireless power transfer system is disclosed. The wireless power transfer system includes a first converting unit configured to convert a first DC voltage of an input power to a first AC voltage. Further, the wireless power transfer system includes a contactless power transfer unit configured to receive the input power having the first AC voltage from the first converting unit and transmit the input power. Also, the wireless power transfer system includes a second converting unit configured to receive the input power from the contactless power transfer unit and convert the first AC voltage of the input power to a second DC voltage. Furthermore, the wireless power transfer system includes a switching unit configured to regulate the second DC voltage across the electric load if the second DC voltage across the electric load is greater than a voltage reference value.

19 Claims, 6 Drawing Sheets

Related U.S. Application Data continuation of application No. 15/420,139, filed on Jan. 31, 2017, now Pat. No. 10,673,275.

(51) Int. Cl.
*H02J 50/80* (2016.01)
*H04B 5/00* (2006.01)

(58) Field of Classification Search
USPC .......................................................... 307/104
See application file for complete search history.

(56) References Cited

U.S. PATENT DOCUMENTS

| | | | |
|---|---|---|---|
| 8,004,235 | B2 | 8/2011 | Baarman et al. |
| 8,060,011 | B2 | 11/2011 | Mikimoto |
| 8,129,864 | B2 | 3/2012 | Baarman et al. |
| 8,232,829 | B2 | 7/2012 | Robinson, III |
| 8,929,043 | B2 | 1/2015 | Kim et al. |
| 9,124,113 | B2 | 9/2015 | Hu et al. |
| 9,153,998 | B2 | 10/2015 | Mayo |
| 9,269,489 | B2 | 2/2016 | Wu et al. |
| 10,236,720 | B2 | 3/2019 | Moon et al. |
| 10,263,472 | B2 | 4/2019 | Sugiyama et al. |
| 10,381,877 | B2 | 8/2019 | Su |
| 10,601,248 | B2 * | 3/2020 | Zhang .................. H01F 38/14 |
| 10,673,275 | B2 | 6/2020 | Jha et al. |
| 10,700,510 | B2 | 6/2020 | Jha et al. |
| 10,700,550 | B2 | 6/2020 | Jha et al. |
| 11,394,239 | B2 | 7/2022 | Jha et al. |
| 2008/0068868 | A1 | 3/2008 | Williams |
| 2009/0096413 | A1 | 4/2009 | Partovi et al. |
| 2010/0109445 | A1 | 5/2010 | Kurs et al. |
| 2010/0110741 | A1 | 5/2010 | Lin et al. |
| 2011/0285349 | A1 | 11/2011 | Widmer et al. |
| 2012/0306286 | A1 | 12/2012 | Kim et al. |
| 2013/0176653 | A1 | 7/2013 | Kim et al. |
| 2013/0214611 | A1 | 8/2013 | Bae |
| 2013/0271069 | A1 | 10/2013 | Partovi |
| 2014/0152114 | A1 | 6/2014 | Kim et al. |
| 2014/0346888 | A1 | 11/2014 | Kim et al. |
| 2014/0361628 | A1 | 12/2014 | Huang et al. |
| 2015/0035374 | A1 | 2/2015 | Park et al. |
| 2015/0051109 | A1 | 2/2015 | Berdondini et al. |
| 2015/0054349 | A1 | 2/2015 | Ishikuro et al. |
| 2015/0084428 | A1 | 3/2015 | Moon et al. |
| 2015/0137611 | A1 | 5/2015 | Huang et al. |
| 2015/0229139 | A1 | 8/2015 | Greene |
| 2015/0229225 | A1 | 8/2015 | Jang et al. |
| 2015/0263511 | A1 | 9/2015 | Sandner et al. |
| 2015/0280455 | A1 | 10/2015 | Bosshard et al. |
| 2015/0326143 | A1 | 11/2015 | Petras et al. |
| 2015/0341087 | A1 | 11/2015 | Moore et al. |
| 2015/0349538 | A1 | 12/2015 | Agostinelli et al. |
| 2015/0372622 | A1 | 12/2015 | Ortiz |
| 2016/0006356 | A1 | 1/2016 | Nirantare et al. |
| 2016/0013663 | A1 * | 1/2016 | Zhang .................. H02J 50/12 307/104 |
| 2016/0072398 | A1 | 3/2016 | Deboy |
| 2016/0214488 | A1 | 7/2016 | Okamoto |
| 2016/0254659 | A1 | 9/2016 | Chambon et al. |
| 2017/0025885 | A1 | 1/2017 | Blakely et al. |
| 2017/0063161 | A1 | 3/2017 | Sugiyama et al. |
| 2017/0093225 | A1 | 3/2017 | Murayama et al. |
| 2017/0104368 | A1 | 4/2017 | Radke et al. |
| 2017/0207657 | A1 | 7/2017 | Kotani |
| 2017/0222479 | A1 | 8/2017 | Jha et al. |
| 2017/0222480 | A1 | 8/2017 | Jha et al. |
| 2017/0317524 | A1 | 11/2017 | Yim |
| 2018/0090995 | A1 | 3/2018 | Arasaki et al. |
| 2018/0097351 | A1 | 4/2018 | Jha et al. |
| 2018/0287500 | A1 | 10/2018 | Tsutsui et al. |
| 2020/0251931 | A1 | 8/2020 | Jha et al. |
| 2020/0287375 | A1 | 9/2020 | Jha et al. |
| 2020/0287418 | A1 | 9/2020 | Jha et al. |

FOREIGN PATENT DOCUMENTS

| | | |
|---|---|---|
| EP | 2928038 | 10/2015 |
| EP | 2985846 | 2/2016 |
| EP | 3046220 | 7/2016 |
| EP | 3203605 | 8/2017 |
| EP | 3203606 | 8/2017 |
| WO | 2012091209 | 7/2012 |
| WO | 2013042570 | 3/2013 |
| WO | 2015037949 | 3/2015 |
| WO | 2015115285 | 8/2015 |

OTHER PUBLICATIONS

"Japanese Patent Application 2022000705 Notice of Reasons for Refusal", dated Sep. 30, 2022, 2 pages.
"U.S. Appl. No. 16/880,712 Final Office Action", dated Aug. 16, 2022, 9 pages.
U.S. Appl. No. 16/855,619, Jha, et al.
U.S. Appl. No. 16/880,712, Jha, et al.
U.S. Appl. No. 16/884,338, Jha, et al.
"Chinese Application No. 201710063931 Decision on Rejection", dated Aug. 20, 2021, 21 pages.
"Chinese Application No. 201710063931 First Office Action", dated Mar. 4, 2021, 14 pages.
"Chinese Application No. 201710063931.X Notice of Reexamination", dated Apr. 24, 2022, 10 pages.
"Chinese Application No. 201710063932.4 First Office Action", dated Feb. 26, 2021, 15 pages.
"Chinese Application No. 201710063932.4 Notice of Reexamination", dated Apr. 24, 2022, 12 pages.
"Chinese Application No. 201710063932.4 Second Office Action", dated Jul. 26, 2021, 23 pages.
"Co-pending India Application No. 201641003928, filed Feb. 3, 2016, 41 pages", 41 pages.
"Co-pending India Application No. 201641003929, filed Feb. 3, 2016, 38 pages", 38 pages.
"European Application No. 17153732.7 European Search Report and Opinion", dated Jun. 8, 2017, 9 pages.
"European Application No. 17153732.7 Communication pursuant to Article 94(3) EPC", dated Nov. 29, 2018, 6 pages.
"European Application No. 17153808.5 Communication pursuant to Article 94(3) EPC", dated Dec. 14, 2018, 6 pages.
"European Application No. 17153808.5 European Search Report and Opinion", dated Jun. 7, 2017, 10 pages.
"European U.S. Appl. No. 20/175,824 Communication pursuant to Article 94(3) EPC", dated Apr. 5, 2022, 3 pages.
"European Application No. 20175824.0 Communication pursuant to Article 94(3) EPC", dated Nov. 30, 2020, 7 pages.
"India Application No. 10-2016-41033404 First Examination Report", dated Feb. 7, 2019, 6 pages.
"Japanese Application No. 2017-013768 Notification of Reason for Refusal", dated Dec. 25, 2020, 3 pages.
"Japanese Application No. 2017-013769 Notification of Reason for Refusal", dated Nov. 9, 2021, 5 pages.
"Japanese Application No. 2017-013769 Notification of Reason for Refusal", dated Dec. 25, 2020, 3 pages.
"Qi System Description Wireless Power Transfer", Wireless Power Consortium, vol. 1:Low Power, Part 1:Interface Definition, Version 1.0.1, Oct. 2010, 88 pages.
"THE Qi Wireless Power Transfer Power Class 0 Specification", Qi Wireless Power Consortium, Parts 1 and 2: Interface Definitions, Version 1.2.2, Apr. 2016, 160 pages.
"THE Qi Wireless Power Transfer Power Class 0 Specification", Qi Wireless Power Consortium, Part 4: Reference Designs, Version 1.2.2, Apr. 2016, 310 pages.
"U.S. Appl. No. 15/417,246 Office Action", dated Nov. 13, 2019, 22 pages.
"U.S. Appl. No. 15/417,246 Office Action", dated Apr. 18, 2019, 19 pages.
"U.S. Appl. No. 15/420,139 Final Office Action", dated Apr. 22, 2019, 15 pages.

(56) References Cited

OTHER PUBLICATIONS

"U.S. Appl. No. 15/420,139 Office Action", dated Sep. 28, 2018, 10 pages.

"U.S. Appl. No. 15/717,855 Office Action", dated Nov. 13, 2019, 13 pages.

"U.S. Appl. No. 15/717,855 Office Action", dated May 2, 2019, 19 pages.

"U.S. Appl. No. 16/855,619 Final Office Action", dated Jan. 7, 2022, 9 pages.

"U.S. Appl. No. 16/855,619 Office Action", dated Aug. 16, 2021, 12 pages.

"U.S. Appl. No. 16/880,712 Final Office Action", dated Sep. 7, 2021, 9 pages.

"U.S. Appl. No. 16/880,712 Office Action", dated Jan. 25, 2022, 13 pages.

"U.S. Appl. No. 16/880,712 Office Action", dated May 3, 2021, 8 pages.

"U.S. Appl. No. 16/884,338 Final Office Action", dated Sep. 7, 2021, 13 pages.

"U.S. Appl. No. 16/884,338 Office Action", dated Jan. 25, 2022, 16 pages.

"U.S. Appl. No. 16/884,338 Office Action", dated May 4, 2021, 10 pages.

Cheng, et al., "Adaptive On/Off Delay-Compensated Active Rectifiers for Wireless Power Transfer Systems", IEEE Journal of Solid-Slate Circuits, vol. 51, Issue: 3, pp. 712-723, Mar. 2016, 12 pages.

De Silva, et al., "The Package Integration of RF-MEMS Switch and Control IC for Wireless Applications", IEEE Transactions on Advanced Packaging, vol. 26, No. 3, pp. 255-260 (Aug. 2003), Aug. 2003, 6 pages.

Jang, et al., "New Soft-Switched Contactless Battery Charger With Robust Local Controllers", IEICE/IEEE MTELEC'03, Oct. 19-23, 2003, pp. 473-479, Oct. 19-23, 2003, 7 pages.

Jha, et al., "System and Method for Protecting a Wireless Power Transfer System", Ge Co-Pending Application No. 201641003928, filed on Feb. 3, 2016, 40 pages.

Jha, et al., "System and Method for Protecting a Wireless Power Transfer System", Ge Co-Pending Application No. 201641003929, Feb. 3, 2016, 37 Pages.

Sun, et al., "A High Speed Comparator Based Active Rectifier for Wireless Power Transfer Systems", Intelligent Radio for Future Personal Terminals {IMWS-IRFPT), 2011 IEEE MTI-S International Microwave Workshop Series, Aug. 24-25, 2011, 2 pages.

Trivino-Cabrera, et al., "Independent Primary-Side Controller Applied To Wireless Chargers for Electric Vehicles", IEEE International Electric Vehicle Conference (IEVC), pp. 1-5, (Dec. 17-19, 2014), Dec. 2014, 5 pages.

"U.S. Appl. No. 16/880,712 Non Final Office Action", dated Mar. 1, 2023, 8 pages.

"U.S. Appl. No. 16/880,712 Final Office Action", dated Jul. 28, 2023, 12 pages.

\* cited by examiner

METHOD AND SYSTEM FOR PROTECTING A WIRELESS POWER TRANSFER SYSTEM

RELATED APPLICATIONS

This application is a continuation of U.S. application Ser. No. 16/855,619 filed Apr. 20, 2020, which is a continuation of U.S. application Ser. No. 15/420,139 filed Jan. 31, 2017, which claims the priority benefit of India Application No. 201641003929 filed Feb. 3, 2016.

BACKGROUND

Embodiments of the present invention relate generally to wireless power transfer systems and more particularly to a system and method for protecting a wireless power transfer system.

In one or more industries, an electric vehicle or a hybrid vehicle includes one or more batteries that supply electrical power to drive the vehicle. In one example, the batteries supply energy to an electric motor to drive a shaft in the vehicle, which in turn drives the vehicle. The batteries are used for supplying the power and hence may be drained and need to be charged from an external power source.

In general, power transfer systems are widely used to transfer power from a power source to one or more electric loads, such as for example, the batteries in the vehicle. Typically, the power transfer systems may be contact based power transfer systems or contactless power transfer systems. In the contact based power transfer systems, components, such as plug, socket connectors, and wires are physically coupled to the batteries for charging the batteries. However, due to environmental impact, such connectors and wires may be damaged or corroded. Also, high currents and voltages are used for charging the batteries. Hence, establishing a physical connection between the power source and the batteries in the vehicle may involve cumbersome safety measures. Also, this power transfer system may become bulkier and heavier compared to the contactless power transfer system.

In the contactless power transfer systems, power converters are used to convert an input power to a transferrable power, which is further transmitted to the electric load, such as the batteries in the vehicle. The power converter includes switches which are operated at a particular switching frequency to convert the input power to the transferrable power. Typically, depending upon the load, the switching frequency of the power converter is changed to regulate or control an output voltage of the power transfer system. However, if the electric load is disconnected or varied, the output voltage of the power transfer system may attain a very high value in a very short time period. Such a sudden increase in the output voltage may lead to failure of operation and may also damage one or more components in the power transfer system.

Therefore, there is a need for an improved system and method for protecting the power transfer system.

BRIEF DESCRIPTION

In accordance with one embodiment of the present invention, a wireless power transfer system is disclosed. The wireless power transfer system includes a first converting unit configured to convert a first DC voltage of an input power to a first AC voltage. Further, the wireless power transfer system includes a contactless power transfer unit communicatively coupled to the first converting unit and configured to receive the input power having the first AC voltage from the first converting unit and transmit the input power. Also, the wireless power transfer system includes a second converting unit communicatively coupled to the contactless power transfer unit and configured to receive the input power from the contactless power transfer unit and convert the first AC voltage of the input power to a second DC voltage. The input power having the second DC voltage is transmitted to an electric load. Furthermore, the wireless power transfer system includes a switching unit coupled to the contactless power transfer unit and the second converting unit and configured to regulate the second DC voltage across the electric load if the second DC voltage across the electric load is greater than a voltage reference value.

In accordance with another embodiment of the present invention, a switching unit for protecting a wireless power transfer system is disclosed. The switching unit includes a switch configured to be electrically coupled across the second converting unit. The second converting unit is configured to be coupled to an electric load. Also, the switching unit includes a controller electrically coupled to the switch and configured to generate and feed a control signal having a determined duty cycle to the switch to regulate an output DC voltage across the electric load.

In accordance with another embodiment of the present invention, a method for protecting a wireless power transfer system is disclosed. The method includes converting, by a first converting unit, a first DC voltage of an input power to a first AC voltage. Further, the method includes receiving from the first converting unit and transmitting, by a contactless power transfer unit, the input power having the first AC voltage. Also, the method includes converting, by a second converting unit, the first AC voltage of the input power to a second DC voltage. Furthermore, the method includes transmitting the input power having the second DC voltage from the second converting unit to an electric load. In addition, the method includes regulating, by a switching unit, the second DC voltage across the electric load if the second DC voltage across the electric load is greater than a voltage reference value.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for protecting a wireless power transfer system are disclosed. Also, various embodiments of a system and method for regulating an output voltage of the wireless power transfer system are disclosed. In particular, the system and method disclosed herein employ a switching unit to protect one or more components in the wireless power transfer system. More specifically, the switching unit decouples the one or more components in the system if an output voltage of the wireless power transfer system increases to an undesirable value. Further, the switching unit may be used to control or regulate the output voltage of the wireless power transfer system even if an electric load coupled to the wireless power transfer system changes substantially.

Figure 1:
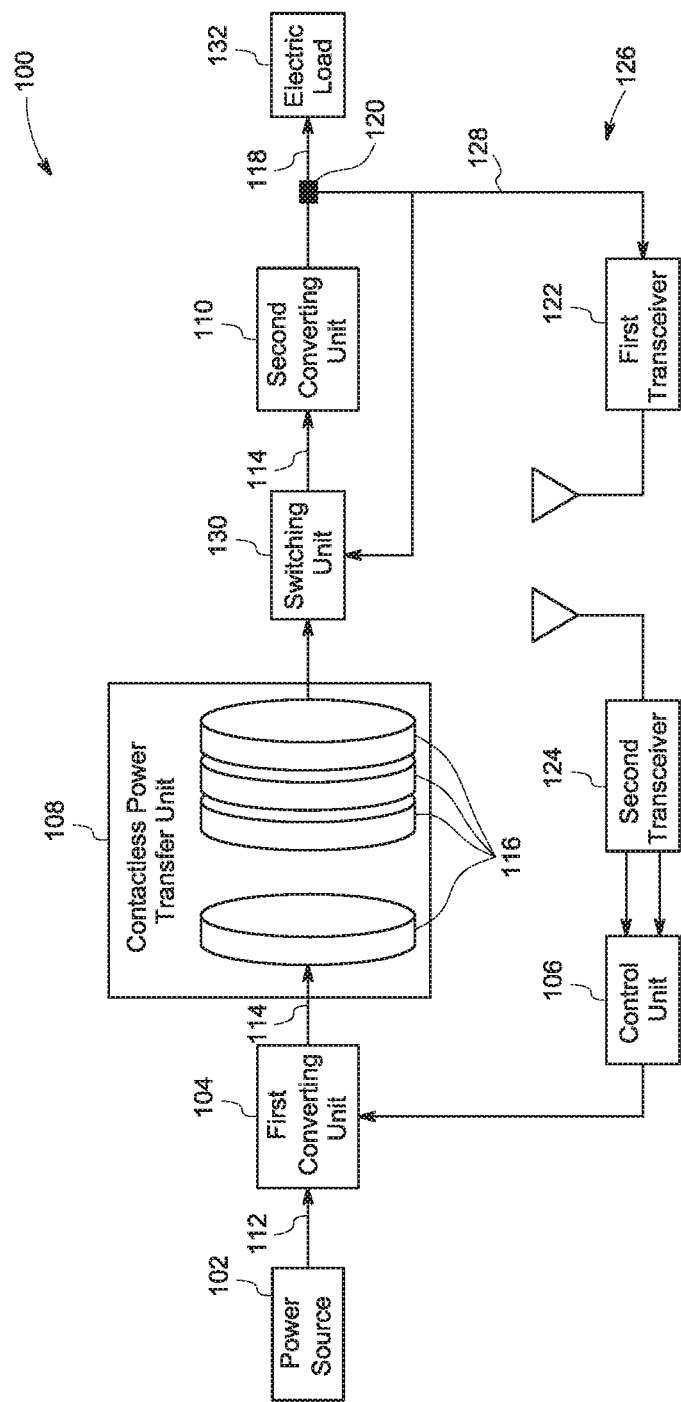
FIG. 1 is a block diagram representation of a wireless power transfer system having a switching unit in accordance with an embodiment of the present invention.

FIG. 1 is a diagrammatical representation of a wireless power transfer system 100 in accordance with an embodiment of the present invention. The wireless power transfer system 100 is used to transmit an electrical power from a power source 102 to one or more electric loads 132 such as, batteries, light loads, mobile devices like cell phones, laptops, HVAC systems etc. Particularly, in an automobile industry, an electric vehicle or a hybrid vehicle includes one or more batteries that supply electrical power to drive the vehicle. Such batteries may be electrically charged from the power source 102 via the wireless power transfer system 100. In one embodiment, the wireless power transfer system 100 may also be referred as a contactless power transfer system.

In the illustrated embodiment, the wireless power transfer system 100 includes a first converting unit 104 (inverter), a control unit 106, a contactless power transfer unit 108, and a second converting unit 110 (rectifier). The first converting unit 104 is electrically coupled to the power source 102 and the control unit 106. The power source 102 is configured to supply an input power having a first DC voltage 112 to the first converting unit 104. In some embodiments, the input power may be in a range from about 100 W to about 6.6 kW. In one embodiment, the power source 102 may be a part of the wireless power transfer system 100. In another embodiment, the power source 102 may be positioned external to the wireless power transfer system 100.

The first converting unit 104 is configured to receive the input power having the first DC voltage 112 from the power source 102. Further, the first converting unit 104 is configured to operate at a determined switching frequency to convert the first DC voltage 112 of the input power to a first AC voltage 114. Particularly, the control unit 106 may determine the switching frequency of the first converting unit 104 based on the electric load 132 coupled to the wireless power transfer system 100. In one example, the control unit 106 may include a digital circuit or a processor that performs one or more functions based on pre-stored instructions or programs. Upon converting the first DC voltage 112 of the input power to the first AC voltage 114, the first converting unit 104 is further configured to transmit the input power having the first AC voltage 114 to the contactless power transfer unit 108.

The contactless power transfer unit 108 includes two or more coils or an array of coils 116 that are magnetically coupled to each other. The coils 116 are used for wirelessly transmitting the input power having the first AC voltage 114 from the first converting unit 104 to the second converting unit 110. The details pertaining to transmitting the power using the coils 116 are explained in greater detail below with reference to FIG. 2.

The second converting unit 110 is electrically coupled to the contactless power transfer unit 108 via a switching unit 130. Upon receiving the power having the first AC voltage 114 from the contactless power transfer unit 108, the second converting unit 110 is configured to convert the power having the first AC voltage 114 to an output power having a second DC voltage 118. Further, the second converting unit 110 is configured to transmit the output power having the second DC voltage 118 to the electric load 132. In one example, the output power may be used for charging the electric load including one or more batteries that are coupled to the wireless power transfer system 100.

Additionally, the wireless power transfer system 100 includes a sensor 120, a first transceiver 122, and a second transceiver 124 that together form a feedback loop 126. The sensor 120 is used to sense the second DC voltage (output voltage) 118. The feedback loop 126 is used to communicate a voltage signal ($V_o$) 128 representative of the second DC voltage 118 from the sensor 120 to the control unit 106 via the first transceiver 122 and the second transceiver 124. Further, the control unit 106 may be used to adjust or change the switching frequency of the first converting unit 104 based on the received voltage signal ($V_o$) 128 to control or regulate the second DC voltage 118 across the electric load 132.

However, since the voltage signal ($V_o$) 128 is communicated using a wireless communication path between the first transceiver 122 and the second transceiver 124, the control unit 106 may receive the voltage signal ($V_o$) 128 after a certain time delay. In one embodiment, the delay may be in a range from about 1 millisecond to about 5 milliseconds.

The control unit 106 may not be able to timely control the second DC voltage 118 across the electric load 132 due to the delay in communicating the voltage signal ($V_o$) 128. As result, the second DC voltage 118 may increase above a critical value, which in turn may damage the second converting unit 110 and/or other components in the wireless power transfer system 100. The critical value may be a voltage value above which the components in the wireless power transfer system 100 may be damaged. In one embodiment, the critical value may be in a range from about 400V to about 500V.

To overcome the issues related to increase of the second DC voltage 118 above a critical value, the exemplary wireless power transfer system 100 includes the switching unit 130 to protect the second converting unit 110 from damage. Particularly, the switching unit 130 is electrically coupled to the contactless power transfer unit 108 and the second converting unit 110. The switching unit 130 is configured to decouple the second converting unit 110 from the contactless power transfer unit 108 if the second DC voltage 118 is greater than a first threshold value ($V_o$Max). The first threshold value ($V_o$Max) may be less than the critical value. In one embodiment, the first threshold value ($V_o$Max) may be in a range from about 350V to about 450V.

The input power is not transmitted to the second converting unit 110 or the electric load 132 by decoupling the second converting unit 110 from the contactless power transfer unit 108. As a result, the second DC voltage 118 across the electric load 132 may be reduced below the first threshold value ($V_o$Max). The switching unit 130 is configured to prevent the second DC voltage 118 from attaining a critical value, which in turn protects the second converting unit 110 from damage. The protection of the second converting unit 110 is described in greater detail with reference to FIG. 2.

Furthermore, in one embodiment, the switching unit 130 may be used to regulate or control the second DC voltage 118 across the electric load 132. If the second DC voltage 118 is greater than a voltage reference value ($V_o$ref), the switching unit 130 is configured to regulate or control the second DC voltage 118 without decoupling the second converting unit 110 from the contactless power transfer unit 108. The regulation of the second DC voltage 118 is described in greater detail with reference to FIG. 3.

Figure 2:
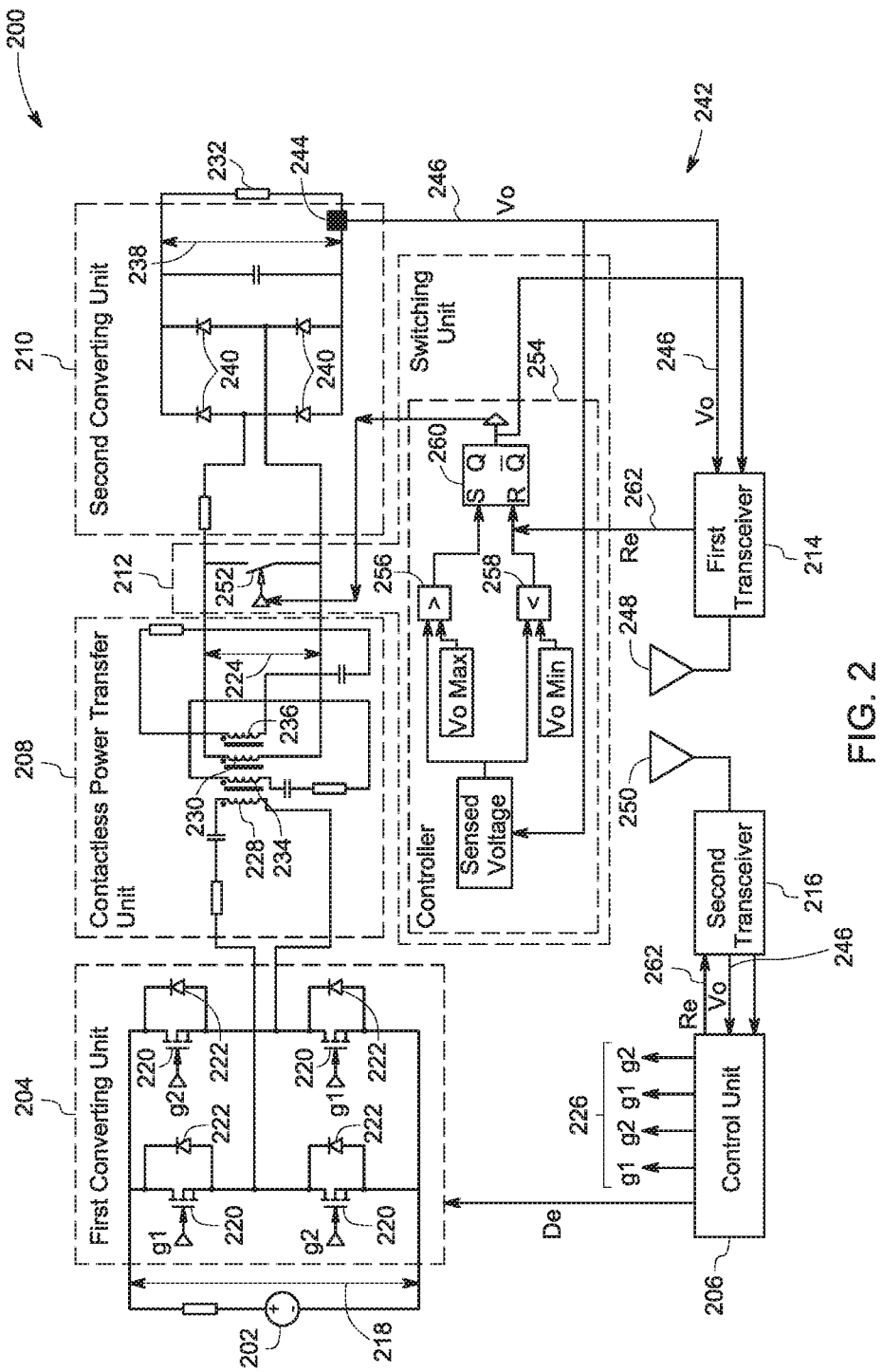
FIG. 2 is a schematic representation of a wireless power transfer system in accordance with an embodiment of the present invention.

Referring to FIG. 2, a schematic representation of a wireless power transfer system 200 in accordance with an embodiment of the present invention is depicted. The wireless power transfer system 200 is similar to the wireless power transfer system 100 of FIG. 1. The wireless power transfer system 200 is used to transmit an input power from a power source 202 to an electric load 232 such as one or more batteries in an electric or hybrid vehicle.

The wireless power transfer system 200 includes a first converting unit 204, a control unit 206, a contactless power transfer unit 208, a second converting unit 210, a switching unit 212, a first transceiver 214, and a second transceiver 216. It may be noted that the wireless power transfer system 200 may include other components and may not be limited to the components shown in FIG. 2.

In the illustrated embodiment, the first converting unit 204 is electrically coupled to the power source 202 and configured to receive the input power having a first DC voltage 218 from the power source 202. The first converting unit 204 includes a plurality of switches 220 and diodes 222 that are electrically coupled between an input terminal and an output terminal of the first converting unit 204. In one example, the switches 220 may include electronic switches, such as MOSFETs or IGBTs. The plurality of switches 220 and the diodes 222 are arranged to form a DC-AC converter.

The switches 220 are activated and deactivated based on a switching frequency of the first converting unit 204 to convert the first DC voltage 218 of the input power to a first AC voltage 224. Particularly, the control unit 206 is configured to determine the switching frequency of the first converting unit 204 based on the electric load 232 coupled to the wireless power transfer system 200. Further, the control unit 206 is configured to send one or more gate signals 226 that are representative of the switching frequency to the plurality of switches 220 in the first converting unit 204 to convert the first DC voltage 218 of the input power to the first AC voltage 224. The input power having the first AC voltage 224 is transmitted from the first converting unit 204 to the contactless power transfer unit 208.

The contactless power transfer unit 208 is electrically coupled to the first converting unit 204 for receiving the input power having the first AC voltage 224. The contactless power transfer unit 208 includes a primary coil 228 and a secondary coil 230. The primary coil 228 is electrically coupled to the first converting unit 204. In a similar manner, the secondary coil 230 is electrically coupled to the second converting unit 210. The primary coil 228 and the secondary coil 230 are magnetically coupled to each other.

In addition to the primary coil 228 and the secondary coil 230, the contactless power transfer unit 208 includes a field focusing coil 234 and a compensation coil 236. The field focusing coil 234 is positioned between the primary coil 228 and the secondary coil 230. The field focusing coil 234 is magnetically coupled to the primary coil 228 and the secondary coil 230. In a similar manner, the compensation coil 236 is magnetically coupled to the secondary coil 230. It may be noted that the contactless power transfer unit 208 may include two or more coils for transferring the power from the first converting unit 204 to the second converting unit 210.

Further, the input power having the first AC voltage 224 from the first converting unit 204 is configured to excite the primary coil 228 and the field focusing coil 234 simultaneously. The magnetic field generated by the primary coil 228 is focused towards the secondary coil 230 via the field focusing coil 234. The secondary coil 230 is configured to receive the magnetic field and convert the magnetic field to the input power having the first AC voltage 224. The power having the first AC voltage 224 is then transmitted from the secondary coil 230 to the second converting unit 210. In one embodiment, the field focusing coil 234 is electrically coupled to one or more resonators that are arranged in an array which are excited by the input power simultaneously to enhance the coupling between the primary coil 228 and the secondary coil 230. The compensation coil 236 is configured to match an impedance of the contactless power transfer unit 208 with the second converting unit 210.

The second converting unit 210 is configured to convert the power having the first AC voltage 224 to an output power having a second DC voltage 238. Particularly, the second converting unit 210 includes a plurality of diodes, MOSFETs, or IGBTs 240 that are electrically coupled between an input terminal and an output terminal of the second converting unit 210. The power having the second DC voltage 238 is transmitted to the electric load 232. In one embodiment, the electric load 232 may be batteries that are electrically charged by using the power received from the second converting unit 210. It may be noted that herein the terms "output voltage" and "second DC voltage" may be used interchangeably.

Additionally, the wireless power transfer system 200 includes a sensor 244, a first transceiver 214, and a second transceiver 216 that together form a feedback loop 242. The feedback loop 242 is used for communicating load information and/or the second DC voltage information to the control unit 206. More specifically, the sensor 244 is electrically coupled to the output terminal of the second converting unit 210 to determine the second DC voltage 238 across the electric load 232. In one embodiment, the sensor 244 may be a voltage sensor. In such an embodiment, the sensor 244 is configured to transmit a voltage signal ($V_o$) 246 that is representative of the determined second DC voltage 238 to the first transceiver 214.

The first transceiver 214 includes an antenna 248 configured to transmit the voltage signal ($V_o$) 246 towards an antenna 250 of the second transceiver 216. In one embodiment, the first transceiver 214 may be positioned proximate to the electric load 232 and the second transceiver 216 may be positioned proximate to the first converting unit 204 or the power source 202. The second transceiver 216 is configured to receive the voltage signal ($V_o$) 246 transmitted by the first transceiver 214. Further, the second transceiver 216 is configured to transmit the received voltage signal ($V_o$) 246 to the control unit 206.

The control unit 206 is configured to determine a change in the electric load 232 based on the voltage signal ($V_o$) 246 representative of the second DC voltage 238. In response to receiving the voltage signal ($V_o$) 246, the control unit 206 is configured to determine or adjust the switching frequency of the first converting unit 204. Further, the control unit 206 is configured to send gate signals 226 that are representative of the switching frequency to the first converting unit 204 to control the first AC voltage 224 of the first converting unit 204, which in turn controls the second DC voltage 238 across the electric load 232. In other words, the control unit 206 is configured to control or regulate the second DC voltage 238 of the wireless power transfer system 200 based on the voltage signal ($V_o$) 246 received via the feedback loop 242.

Similar to the embodiment of FIG. 1, in order to overcome the issues related to increase of the second DC voltage 238 above a critical value, the exemplary wireless power transfer system 200 includes the switching unit 212 configured to protect the second converting unit 210 from damage. The switching unit 212 includes a switch 252 and a controller 254. The controller 254 is electrically coupled to the switch 252 and the sensor 244.

In the illustrated embodiment, the switch 252 is electrically coupled across the second converting unit 210. The switch 252 is activated if the switch 252 receives a first control signal from the controller 254. Specifically, the switch 252 is activated or closed to short-circuit the secondary coil 230, which in turn decouples the second converting unit 210 from the secondary coil 230. Similarly, the switch 252 may be deactivated if the switch 252 receives a second control signal from the controller 254. Specifically, the switch 252 is deactivated or opened to couple the secondary coil 230 to the second converting unit 210.

The controller 254 includes a first comparator 256, a second comparator 258, and a flip-flop unit 260. The first comparator 256 and the second comparator 258 is electrically coupled to an input terminal of the flip-flop unit 260. An input terminal of the controller 254 is coupled to the first comparator 256 and the second comparator 258. An output terminal of the controller 254 is coupled to the flip-flop unit 260.

The controller 254 is configured to receive the voltage signal ($V_o$) 246 that is representative of the second DC voltage 238 from the sensor 244. Further, the received voltage signal ($V_o$) 246 is transmitted to the first comparator 256 and the second comparator 258. The first comparator 256 is configured to compare the second DC voltage 238 with a first threshold value ($V_oMax$). If the second DC voltage 238 is greater than the first threshold value ($V_oMax$), the first comparator 256 is configured to trigger the flip-flop unit 260 to generate the first control signal at the output terminal of the controller 254.

Similarly, the second comparator 258 is configured to receive the voltage signal ($V_o$) 246 that is representative of the second DC voltage 238. Further, the second comparator 258 is configured to compare the received second DC voltage 238 with a second threshold value ($V_oMin$). It should be noted herein that the second threshold value ($V_oMin$) is less than the first threshold value ($V_oMax$). If the second DC voltage 238 is less than the second threshold value ($V_oMin$), the second comparator 258 is configured to trigger the flip-flop unit 260 to generate the second control signal at the output terminal of the controller 254.

During normal operation of the wireless power transfer system 200, the switch 252 is deactivated to couple the second converting unit 210 to the contactless power transfer unit 208. The second DC voltage 238 across the electric load 232 is controlled or regulated by the control unit 206 based on the voltage signal ($V_o$) 246 received from the sensor 244 via the first transceiver 214 and the second transceiver 216. The controller 254 does not activate or close the switch 252 if the second DC voltage 238 is less than the first threshold value ($V_oMax$).

In certain circumstances, if the full load 232 or a portion of the load 232 is disconnected or decoupled suddenly from the second converting unit 210, the second DC voltage 238 across the load 232 may increase above the first threshold value ($V_oMax$). The sensor 244 determines and send the voltage signal ($V_o$) 246 that is representative of this second DC voltage 238 to the controller 254 and the first transceiver 214. At the controller 254, the first comparator 256 compares the second DC voltage 238 with the first threshold value ($V_oMax$). If the second DC voltage 238 is greater than the first threshold value ($V_oMax$), the first comparator 256 triggers the flip-flop unit 260 to generate the first control signal which is transmitted to the switch 252 to deactivate the switch 252. As a result, the second converting unit 210 is decoupled from the contactless power transfer unit 208.

Concurrently, the first control signal is transmitted from the controller 254 to the first transceiver 214. Further, the first transceiver 214 transmits the voltage signal ($V_o$) 246 received from the sensor 244 and the first control signal received from the controller 254 to the second transceiver 216. The voltage signal ($V_o$) 246 and the first control signal are further transmitted to the control unit 206.

Upon receiving the voltage signal ($V_o$) 246 and the first control signal, the control unit 206 determines that the switch 252 is activated in the wireless power transfer system 200 based on the received first control signal. As a result, the control unit 206 deactivates the first converting unit 204. In one embodiment, the control unit 204 sends the gate signals 226 to the switches 220 in the first power converting unit 204 to deactivate or open the switches 220. As a result, the first converting unit 204 is deactivated or suspended from transmitting the power to the contactless power transfer unit 208 and the second converting unit 210.

Furthermore, after a predetermined time period, the control unit 206 sends a reset signal 262 to the second transceiver 216, which is further transmitted to the first transceiver 214. The first transceiver 216 sends the reset signal 262 to the flip-flop unit 260 in the controller 254. In response to receiving the reset signal 262, the flip-flop unit 260 resets and generates the second control signal at the output terminal of the controller 254. The generated second control signal is transmitted to the switch 252 to deactivate or open the switch 252 so that the second converting unit 210 is coupled to the contactless power transfer unit 208 to permit the second converting unit 210 to continue supplying power having the second DC voltage 238 to the electric load 232.

Concurrently, the generated second control signal at the controller 254 is transmitted to the first transceiver 214. In addition to the second control signal, the first transceiver 214 receives the voltage signal ($V_o$) 246 representative of the second DC voltage 238 across the load 232. Further, the first transceiver 214 transmits the voltage signal ($V_o$) 246 and the second control signal to the second transceiver 216, which is further transmitted to the control unit 206.

Upon receiving the voltage signal ($V_o$) 246 and the second control signal from the second transceiver 216, the control unit 206 determines whether the second DC voltage 238 is less than or equal to the first threshold value ($V_oMax$). If the second DC voltage 238 is less than or equal to the first threshold value ($V_oMax$), the control unit 206 sends the gate signals 226 to the switches 220 in the first converting unit 204 to activate the first converting unit 204. Further, the control unit 206 adjusts or changes the switching frequency of the first converting unit 204 based on the second DC voltage 238 across the electric load 232. In one embodiment, the control unit 206 adjusts or changes the switching frequency of the first converting unit 204 to regulate or control the second DC voltage 238 across the electric load 232. If the second DC voltage 238 is greater than the first threshold value ($V_o$Max), the control unit 206 waits for the predetermined time period to send another reset signal to the controller 254. If the second DC voltage 238 continues to be greater than the first threshold value ($V_o$Max) after transmitting the reset signal for a predetermined number of times, the control unit 206 deactivates the system 200.

Accordingly, by employing the switching unit 212 and the control unit 206, the second DC voltage 238 is prevented from increasing above the critical value. As a result, the second converting unit 210 is protected from damage even if the electric load 232 gets disconnected or decoupled from the wireless power transfer system 200.

Figure 3:
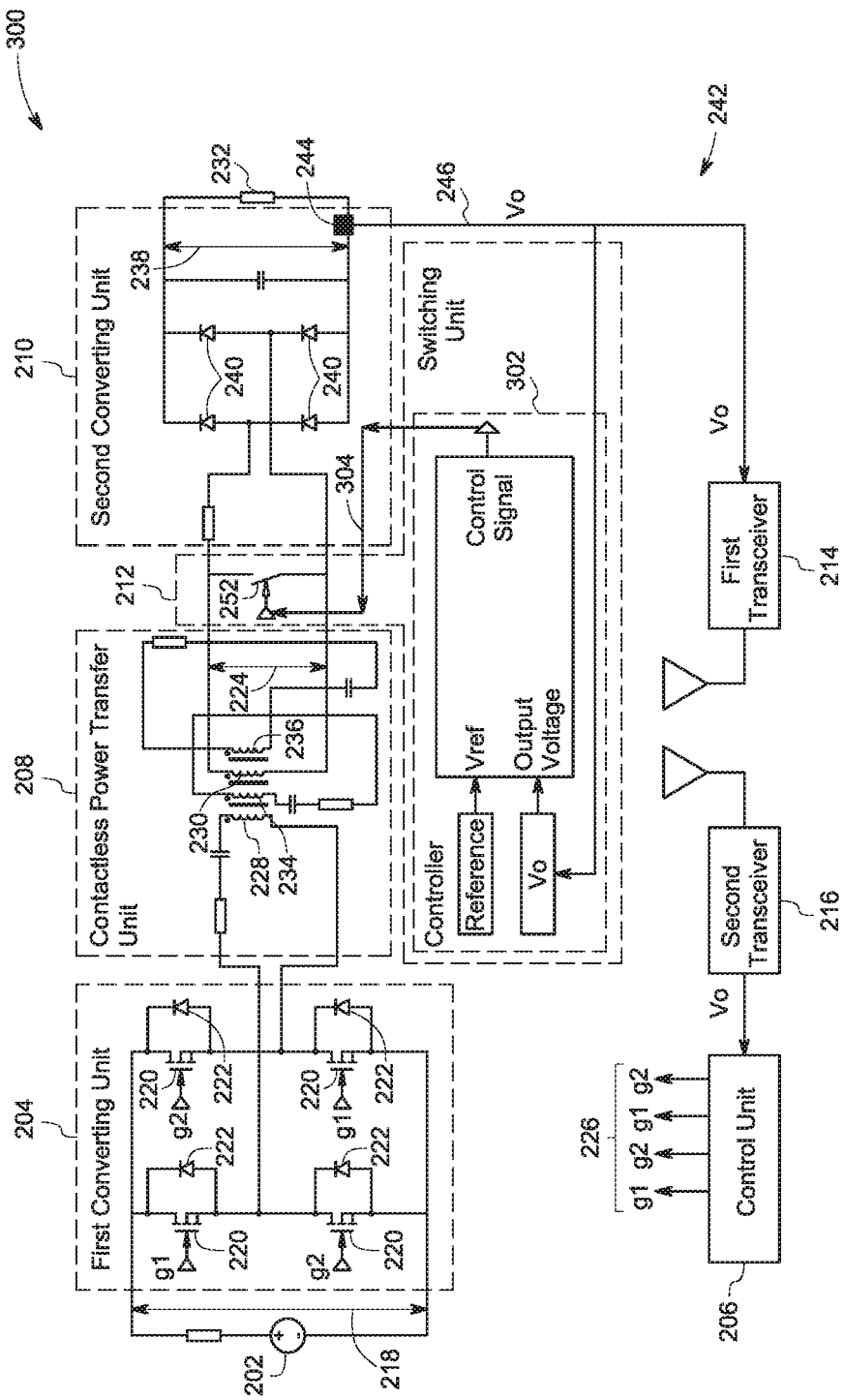
FIG. 3 is a schematic representation of a wireless power transfer system in accordance with another embodiment of the present invention.

Referring to FIG. 3, a schematic representation of a wireless power transfer system 300 in accordance with another embodiment of the present invention. The wireless power transfer system 300 is similar to the wireless power transfer system 200 of FIG. 2 except that a controller 302 in the switching unit 212 is configured to regulate or control the second DC voltage 238 (output voltage) of a second converting unit 210.

During operation, if the electric load 232 gets disconnected from the wireless power system 300, the second DC voltage 238 across the load 232 may increase above a voltage reference value ($V_o$ref). It is required to control or regulate the second DC voltage 238 so that the second DC voltage 238 is not increased above a critical value. In one example, the voltage reference value ($V_o$ref) is less than the critical value.

The sensor 244 determines the second DC voltage 238 across the electric load 232. Further, the sensor 244 transmits a voltage signal ($V_o$) 246 representative of the second DC voltage 238 to the controller 302. At the controller 302, the second DC voltage 238 is compared with the voltage reference value ($V_o$ref). If the second DC voltage 238 is greater than the voltage reference value ($V_o$ref), the controller 302 generates a control signal 304 having a determined duty cycle to control the switch 252. In one embodiment, the controller 302 may determine or select the duty cycle using a look-up table. For example, if the second DC voltage 238 is 90 volts, a duty cycle of 0.75 corresponding to 90 volts is selected from the look-up table. In another example, if the second DC voltage 238 is 170 volts, a duty cycle of 0.5 corresponding to 170 volts is selected from the look-up table. In yet another example, if the second DC voltage 238 is 250 volts, a duty cycle of 0.25 corresponding to 250 volts is selected from the look-up table.

The controller 302 transmits the control signal 304 having the determined duty cycle to the switch 252 to regulate or control the second DC voltage 238 across the load 232. Particularly, the control signal 304 includes switching pulses having the determined duty cycle. The switching pulses are transmitted to the switch 252 to regulate or control the second DC voltage 238 across the load 232.

Concurrently, the voltage signal ($V_o$) 246 is transmitted from the sensor 244 to the first transceiver 214. Further, the first transceiver 214 transmits the voltage signal ($V_o$) 246 to the second transceiver 216, which in turn is transmitted to the control unit 206.

At the control unit 206, gate signals 226 are generated based on the second DC voltage 238. Further, the control unit 206 transmit the gate signals 226 to the switches 220 in the first converting unit 204 to adjust or change the switching frequency of the first converting unit 204. As a result, the first AC voltage 224 from the first converting unit 204 is regulated, which in turn controls or regulates the second DC voltage 238 across the load 232. However, the regulation of the second DC voltage 238, using the control unit 206, occurs after the regulation of the second DC voltage, using the controller 302. Hence, the controller 302 may perform faster regulation of the second DC voltage 238 compared to the regulation of the second DC voltage 238 by the control unit 206.

Accordingly, the second DC voltage 238 across the load 232 is regulated or controlled by employing the switching unit 212 before the second DC voltage 238 reaches the critical value. As a result, the second converting unit 210 is prevented from damage even if the electric load 232 is disconnected from the wireless power transfer system 300.

Figure 4:
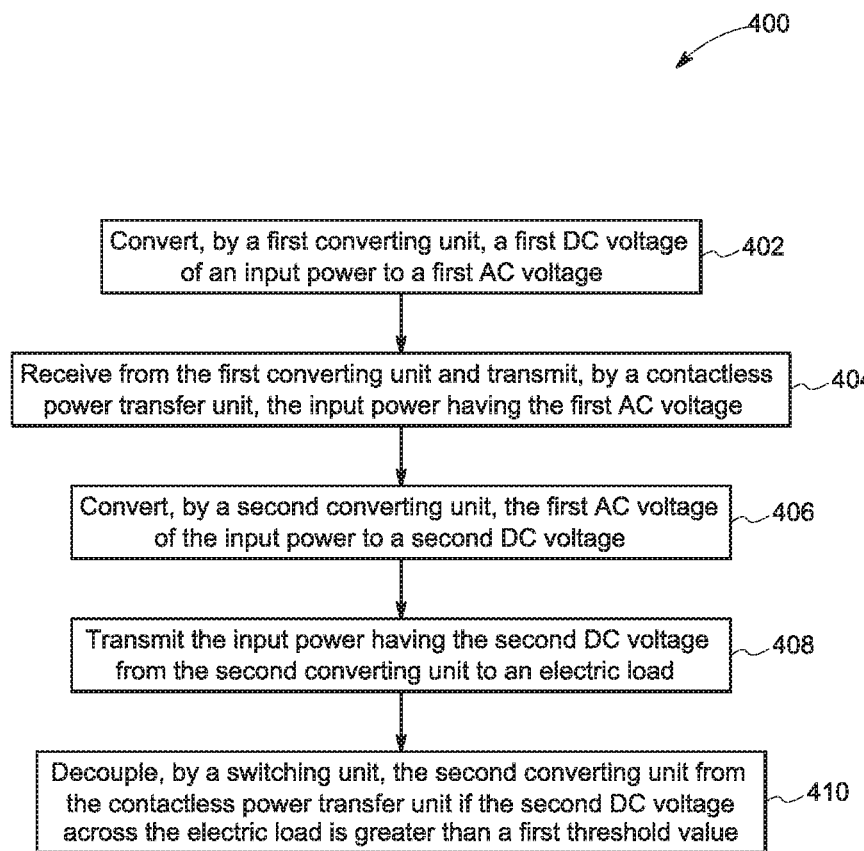
FIG. 4 is a flow chart illustrating a method for protecting a wireless power transfer system in accordance with an embodiment of the present invention.

Referring to FIG. 4, a flow chart illustrating a method 400 for protecting the wireless power transfer system in accordance with aspects of the present invention is depicted. The method 400 is described with reference to the components of FIGS. 1 and 2. At step 402, a first DC voltage of an input power is converted to a first AC voltage. A first converting unit is coupled to a power source for receiving the input power having the first DC voltage. The first converting unit is operated at a determined switching frequency to convert the first DC voltage of the input power to the first AC voltage.

Subsequently, at step 404, the method includes receiving and transmitting the input power having the first AC voltage. Particularly, a contactless power transfer unit is electrically coupled to the first converting unit to receive the input power having the first AC voltage. The contactless power transfer unit transmits the input power having the first AC voltage to a second converting unit. Furthermore, at step 406, the first AC voltage of the input power is converted to a second DC voltage. A second converting unit is electrically coupled to the contactless power transfer unit to receive the input power having the first AC voltage. Further, the second converting unit converts the first AC voltage of the input power to the second DC voltage. At step 408, the input power having the second DC voltage is transmitted from the second converting unit to an electric load. In one embodiment, the electric load may be one or more batteries that are electrically charged using the input power having the second DC voltage received from the second converting unit.

At step 410, the second converting unit is decoupled from the contactless power transfer unit if the second DC voltage across the electric load is greater than a first threshold value ($V_o$Max). Specifically, a switching unit is used to decouple the second converting unit from the contactless power transfer unit. As a result, the second DC voltage across the electric load is reduced below the first threshold value ($V_o$Max), thereby protecting the second converting unit from damage due to over voltage. Furthermore, if the determined second DC voltage is less than a second threshold value ($V_o$Min), the switching unit couples the second converting unit to the contactless power transfer unit to continue supplying power having the second DC voltage to the electric load.

Figure 5:
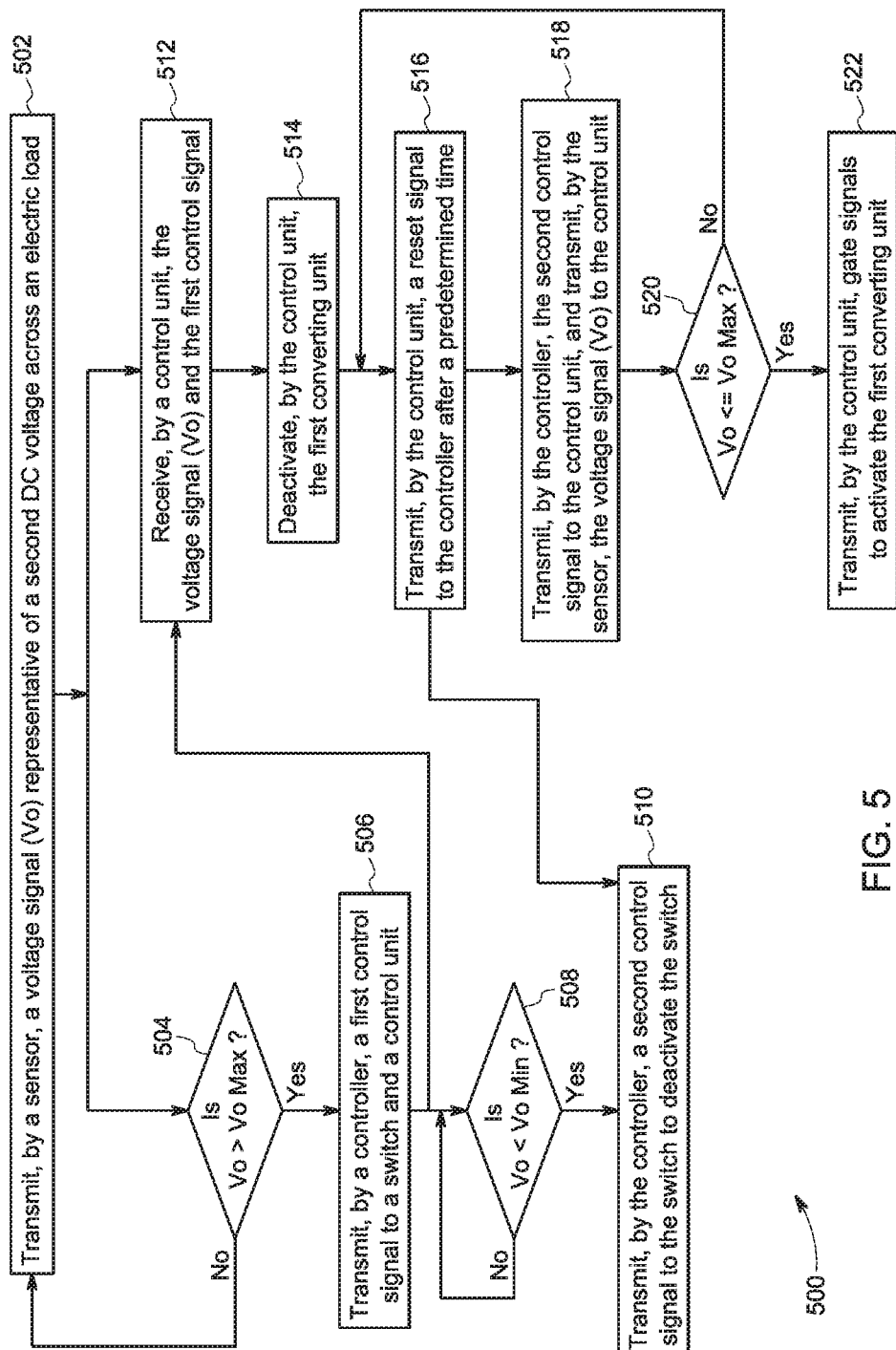
FIG. 5 is a flow chart illustrating a method for decoupling and coupling a converting unit in a wireless power transfer system in accordance with an embodiment of the present invention.

Referring to FIG. 5, a flow chart illustrating a method for decoupling and coupling a second converting unit in a wireless power transfer system in accordance with an embodiment of the present invention is depicted. Specifically, the method 500 includes steps involved in the step 410 of FIG. 4. At step 502, a voltage signal ($V_o$) representative of a second DC voltage across an electric load is transmitted by a sensor. More specifically, the sensor transmits the voltage signal ($V_o$) to a controller. Further, the sensor transmits the voltage signal ($V_o$) to a control unit via a first transceiver and a second transceiver.

Subsequently, at step 504, the controller determines whether the voltage signal ($V_o$) representative of the second DC voltage is greater than a first threshold value ($V_o$Max). If the voltage signal ($V_o$) representative of the second DC voltage is greater than the first threshold value ($V_o$Max), the controller transmits a first control signal to a switch to activate or close the switch as depicted in step 506. As a result, the second converting unit is decoupled from the contactless power transfer unit and thereby the second DC voltage across the load is reduced below the first threshold value ($V_o$Max). More specifically, the second DC voltage is prevented from reaching a critical value that is greater than the first threshold value ($V_o$Max). The critical value may be a voltage value above which the second converting unit may be damaged. Concurrently, the controller sends a first control signal to the control unit via the first transceiver and the second transceiver.

Furthermore, at step 508, the controller determines whether the voltage signal ($V_o$) representative of the second DC voltage is less than a second threshold value ($V_o$Min). If the voltage signal ($V_o$) representative of the second DC voltage is less than the second threshold value ($V_o$Min), the controller sends a second control signal to the switch to deactivate or open the switch as depicted in step 510. As a result, the second converting unit is coupled to the contactless power transfer unit to receive and supply the power to the electric load.

At step 512, the control unit receives the voltage signal ($V_o$) and the first control signal. The control unit receives the voltage signal ($V_o$) from the sensor via the first transceiver and the second transceiver. The control unit receives the first control signal from the controller via the first transceiver and the second transceiver.

Subsequently, at step 514, the control unit deactivates the first converting unit if the first control signal is received from the controller. The first converting unit is deactivated to prevent the supply of input power to the second converting unit. Furthermore, at step 516, the control unit, transmits a reset signal to the controller via the first transceiver and the second transceiver after a predetermined time period. In response to receiving the reset signal, the controller generates the second control signal. Further, the controller sends the second control signal to the switch to deactivate or open the switch. As a result, the second converting unit is coupled to the contactless power transfer unit to receive and supply the power to the electric load at step 508.

Concurrently, at step 518, the controller transmits the second control signal to the control unit via the first transceiver and the second transceiver. Further, the sensor transmits the voltage signal ($V_o$) to the control unit via the first transceiver and the second transceiver. Subsequently, at step 520, the control unit determines whether the voltage signal ($V_o$) representative of the second DC voltage is less than or equal to the first threshold value ($V_o$Max). If the second DC voltage is less than or equal to the first threshold value ($V_o$Max), at step 522, the control unit transmits gate signals to activate the first converting unit. As a result, the input power is supplied to the second converting unit via the contactless power transfer unit. Further, the electric load receives the power having the second DC voltage from the second converting unit. As a result, one or more components in the wireless power transfer unit are protected from increase in the second DC voltage across the load.

Figure 6:
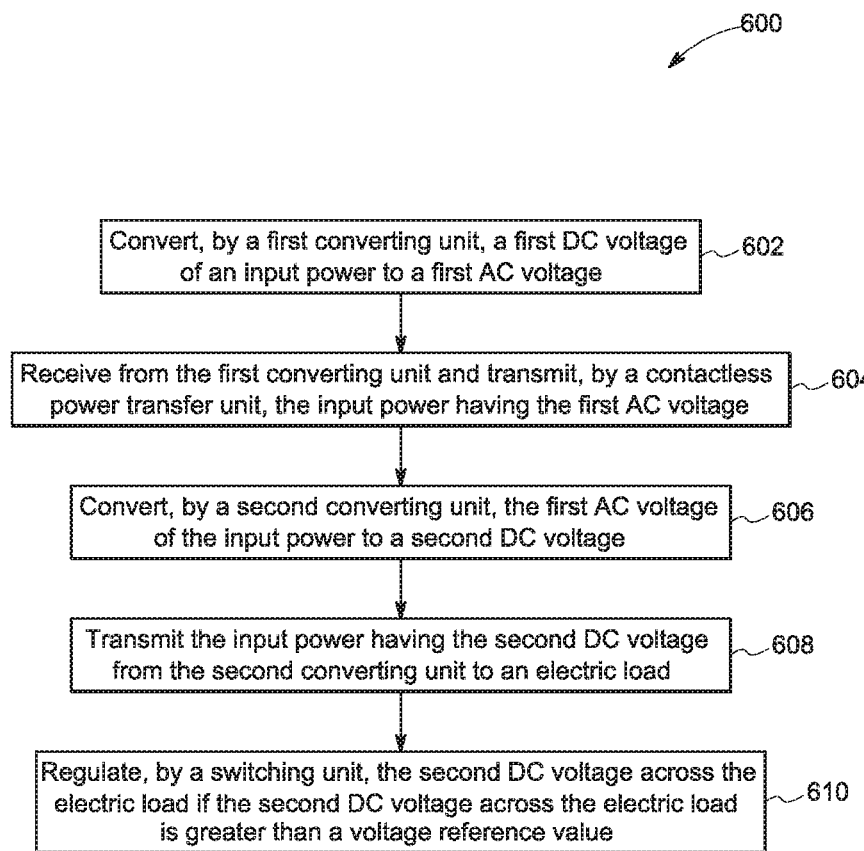
FIG. 6 is a flow chart illustrating a method for regulating an output voltage of a wireless power transfer system in accordance with an embodiment of the present invention.

Referring to FIG. 6, a flow chart illustrating a method 600 for regulating an output voltage of a wireless power transfer system in accordance with an embodiment of the present invention is depicted. At step 602, a first DC voltage of an input power is converted to a first AC voltage. Specifically, a first converting unit is coupled to a power source for receiving the input power having the first DC voltage. Further, the first converting unit is operated at a determined switching frequency to convert the first DC voltage of the input power to the first AC voltage.

Subsequently, at step 604, the method includes receiving and transmitting the input power having the first AC voltage. Particularly, a contactless power transfer unit is electrically coupled to the first converting unit to receive the input power having the first AC voltage. Further, the contactless power transfer unit transmits the input power having the first AC voltage to a second converting unit.

Furthermore, at step 606, the first AC voltage of the input power is converted to a second DC voltage. The second converting unit is electrically coupled to the contactless power transfer unit to receive the input power having the first AC voltage. Further, the second converting unit converts the first AC voltage of the input power to the second DC voltage. At step 608, the input power having the second DC voltage is transmitted from the second converting unit to an electric load. In one embodiment, the electric load may be one or more batteries that are electrically charged by the input power having the second DC voltage received from the second converting unit.

In addition, at step 610, the second DC voltage across the electric load is regulated if the second DC voltage across the electric load is greater than a voltage reference value ($V_o$ref). A switching unit is electrically coupled to the second converting unit and configured to regulate the second DC voltage across the electric load. Particularly, a sensor coupled to an output terminal of the second converting unit is used to determine the second DC voltage across the electric load. Further, a controller which is coupled to the sensor, is used to generate a control signal having a determined duty cycle based on the second DC voltage. More specifically, the controller compares the second DC voltage with a voltage reference value ($V_o$ref). If the second DC voltage is greater than the voltage reference value ($V_o$ref), the controller determines or selects a duty cycle corresponding to the second DC voltage. Further, the controller generates the control signal having the selected or determined duty cycle. Thereafter, the controller feeds the control signal having the determined duty cycle to the switch to regulate the second DC voltage across the electric load to protect the second converting from damage due to over voltage.

In accordance with the exemplary embodiments discussed herein, the exemplary system and method facilitate to protect one or more components in the wireless power transfer system when the load is disconnected. Further, the exemplary system and method facilitate to control or regulate the output voltage when the load is disconnected. As a result, one or more components in the system are protected without decoupling the components from each other in the system.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An apparatus of a wireless power transfer system, comprising:
    a secondary coil configured to receive wireless power from a primary coil associated with a first converting unit, the wireless power having an alternating current (AC) voltage;

a second converting unit comprising a first plurality of circuit elements configured to convert the wireless power from the AC voltage to an output direct current (DC) voltage and provide the output DC voltage to an electric load;

a first transceiver configured to communicate a voltage signal representative of the output DC voltage across the electric load, wherein the voltage signal is configured to cause the first converting unit to adjust the AC voltage of the wireless power based on the output DC voltage across the electric load; and a switching unit electrically coupled to the second converting unit, the switching unit comprising a second plurality of circuit elements configured to regulate the output DC voltage when the output DC voltage across the electric load is greater than a voltage reference value.

2. The apparatus of claim 1, wherein the switching unit is configured to decouple the second converting unit to protect one or more components of the apparatus.

3. The apparatus of claim 1, wherein the first transceiver is further configured to receive a reset signal from a second transceiver of the first converting unit, the reset signal for deactivating the switching unit.

4. The apparatus of claim 1, wherein the switching unit is capable of regulating input power to protect the second converting unit faster than a time period associated with a control unit of the first converting unit.

5. The apparatus of claim 1, wherein the switching unit comprises:
a sensor electrically coupled to the electric load and configured to determine the output DC voltage across the electric load; and
a controller electrically coupled to the sensor and a switch of the switching unit and configured to determine a duty cycle of a control signal configured to control the switch, based on the output DC voltage.

6. The apparatus of claim 5, wherein the controller is configured to generate and feed the control signal having the duty cycle to the switch to regulate input power provided to the second converting unit.

7. The apparatus of claim 5, wherein the controller is configured to determine the duty cycle of the control signal using a look-up table that indicates the duty cycle corresponding to different output DC voltages determined by the sensor.

8. The apparatus of claim 5, wherein the first transceiver is configured to transmit the voltage signal to a second transceiver of the first converting unit.

9. The apparatus of claim 8, wherein a control unit of the first converting unit is electrically coupled to the second transceiver, the control unit comprising a digital circuit configured to adjust a switching frequency of the first converting unit based on the voltage signal representative of the output DC voltage across the electric load.

10. The apparatus of claim 9, wherein the control unit is configured to adjust the switching frequency of the first converting unit to regulate the output DC voltage across the electric load.

11. The apparatus of claim 10, wherein the control unit is configured to regulate the output DC voltage across the electric load after the controller regulates the output DC voltage across the electric load.

12. The apparatus of claim 1, wherein the first converting unit is electrically coupled to a power source that provides a first DC voltage, and wherein the first converting unit is configured to convert the first DC voltage to the first voltage.

13. The apparatus of claim 1, wherein the electric load includes one or more batteries of a vehicle.

14. A method for wireless power transfer in a wireless power transfer system, the method comprising:
receiving, via a secondary coil, wireless power having a first alternating current (AC) voltage from a primary coil associated with a first converting unit;
providing the input power having the first AC voltage to a second converting unit;
converting, by a second converting unit, the wireless power to an output direct current (DC) voltage and providing the output DC voltage to an electric load;
communicating, by a first transceiver, a voltage signal representative of the output DC voltage wherein the voltage signal is configured to cause the first converting unit to adjust the first AC voltage of the wireless power based on the output DC voltage across the electric load; and
regulating, by a switching unit, the output DC voltage when the output DC voltage across the electric load is greater than a voltage reference value.

15. The method of claim 14, further comprising decoupling the second converting unit to protect one or more components of the second converting unit.

16. The method of claim 14, further comprising receiving, by the first transceiver, a reset signal from a second transceiver of the first converting unit, the reset signal for deactivating the switching unit.

17. The method of claim 14, wherein regulating the output DC voltage comprises:
determining, by a sensor, the output DC voltage across the electric load; and
determining, by a controller, a duty cycle of a control signal configured to control a switch of the switching unit, based on the determined output DC voltage.

18. The method of claim 17, wherein a control unit of the first converting unit is configured to adjust a switching frequency of the first converting unit based on the voltage signal to regulate the DC voltage across the electric load.

19. The method of claim 18, wherein the switching frequency of the first converting unit is adjusted after feeding the control signal to the switch.

* * * * *